Nov. 28, 1939.  E. G. HILL ET AL  2,181,532
GEAR SHIFTING MECHANISM FOR MOTOR VEHICLES
Filed Oct. 1, 1935  4 Sheets-Sheet 2

Inventors
E. G. HILL
H. W. HEY
By C. L. Parker
Attorney

Nov. 28, 1939.  E. G. HILL ET AL  2,181,532
GEAR SHIFTING MECHANISM FOR MOTOR VEHICLES
Filed Oct. 1, 1935  4 Sheets-Sheet 3

Inventors
E. G. HILL
H. W. HEY

Nov. 28, 1939.    E. G. HILL ET AL    2,181,532
GEAR SHIFTING MECHANISM FOR MOTOR VEHICLES
Filed Oct. 1, 1935    4 Sheets-Sheet 4

Inventors
E. G. HILL
H. W. HEY
By
Attorney

Patented Nov. 28, 1939

2,181,532

UNITED STATES PATENT OFFICE 2,181,532

GEAR SHIFTING MECHANISM FOR MOTOR VEHICLES

Edward G. Hill and Henry W. Hey, Richmond, Va., assignors to Automatic Shifters, Inc., Richmond, Va., a corporation of Virginia Application October 1, 1935, Serial No. 43,104

33 Claims. (Cl. 192—3.5)

This invention relates to gear shifting mechanisms for motor vehicles.

In our copending application Serial No. 15,904, filed April 11, 1935, we have disclosed a novel form of gear shifting mechanism for motor vehicles which provides highly advantageous features of operation. For example, such gear shifting mechanism is wholly under the control of the operator whereby the gears may be moved to neutral position without the necessity of the operator moving the gear shift lever when the vehicle is stopped, all functions of the shifting mechanism being controlled by a small lever adjacent the steering wheel. Such construction, moreover, completely eliminates the use of electrical control circuits for the valves of the mechanism, thus simplifying the apparatus and rendering it dependable in operation.

One of the principal features of the prior construction referred to lies in the provision of automatic means for equalizing pressures in the power device employed for effecting the gear shifting movement. In other words, a differential pressure power device is employed for shifting the gears and includes a member movable by differential pressure to effect the gear shifting movement, and when the movable member reaches either limit of its movement to place the gears in a selected position, the pressure on opposite sides of the movable member is automatically balanced, thus rendering the next operation of the apparatus much faster than if the previously generated differential pressure had been retained. In the copending application referred to a simple form of mechanism is employed for preventing the operation of the gear shifting mechanism except upon disengagement of the clutch, the prior construction being utilized together with an automatic differential pressure operated clutch control mechanism whereby the operation of the gear shifting mechanism is dependent upon the previous building up of a sufficient differential pressure in the clutch power device to disengage the clutch.

The prior construction referred to is not dependent for its operation on the use of an automatic clutch control mechanism, and the apparatus is operative in conjunction with mechanical clutch lock outs which are now provided on some motor vehicles, such device including mechanical means controlled by the clutch for preventing the shifting of the gears except upon disengagement of the clutch. With the use of the particular means disclosed in our copending application for preventing the operation of the gear shifting mechanism when the clutch is engaged, no differential pressure is present in the gear shifting mechanism when the clutch is engaged, and accordingly atmospheric pressure under such conditions is present on opposite sides of the movable member of the gear shifting power device. The prior construction is operative under the influence of the partial vacuum created in the intake manifold and the automatic valve means employed is such as to create balanced vacuum on opposite sides of the movable member of the power device when the gears reach a selected position, and it is this "vacuum suspension" which renders the device rapid in operation upon the admission of air into one end of the power device.

When atmospheric pressure is present on opposite sides of the movable member of the gear shifting motor during the normal operation of the vehicle, in accordance with the disclosure of our copending application, the "vacuum suspension" of the movable member is destroyed until the clutch is again disengaged. This may cause a very slight retarding of the next gear shifting operation if a gear position is preselected by the control handle prior to the disengagement of the clutch, although the operation of the apparatus is not otherwise interfered with.

In the prior construction referred to, valve means is employed for effecting the "cross-over" from one side of the transmission to the other. More specifically, a rock shaft is illustrated as extending through the top of the transmission and such shaft is axially slidable to determine which of the shift rods of the gear set is operated. To effect axial movement of such shaft, a spring is employed for normally biasing the shaft in one direction, and a small differential pressure operated device is employed for sliding the shaft in the other direction. Such "cross-over" mechanism is fully operative, but possesses one minor disadvantage. The spring means employed for biasing the shaft in one direction is instantaneously operative when released, but in the operation of the differential pressure device for moving the shaft in the other direction, a short interval of time is necessary for the building up of sufficient differential pressure to overcome the tension of the spring before the shaft will be moved in the other direction. Accordingly it will be apparent that the rock shaft is movable slightly more rapidly in one direction than in the other direction.

An important object of the present invention is to provide novel means for preventing the operation of the gear shifting mechanism except when the clutch is disengaged.

A further object is to provide novel means for rendering the gear shifting control valves inoperative when the clutch is engaged.

A further object is to prevent gear shifting except during clutch disengagement, and to accomplish such result without the use of mechanical locking means associated with the gear set and without destroying the "vacuum suspension" of the movable element of the gear shifting motor when the clutch is in engagement.

A further object is to provide differential pressure operated control valves for the gear shifting motor, and to provide novel means for preventing the generation of differential pressures for operating said valves when the vehicle clutch is in engagement.

A further object is to provide novel means for operating the "cross-over" means of the gear set in both directions by differential pressure, thus preventing any relative retarding of the cross-over operation in either direction.

A further object is to provide novel means of the character referred to wherein the differential pressure operated means for the "cross-over" is controlled by the operation of a single valve.

Other objects and advantages of the invention will become apparent during the course of the following description.

In the drawings we have shown one embodiment of the invention. In this showing:

Figure 11 is a vertical sectional view on line 11—11 of Figure 9, Figure 12 is a detail vertical sectional view of a lock-out valve showing its connection with the clutch pedal, and, Figure 13 is a transverse sectional view through the gear shift operating rock shaft and associated elements.

Figure 1:
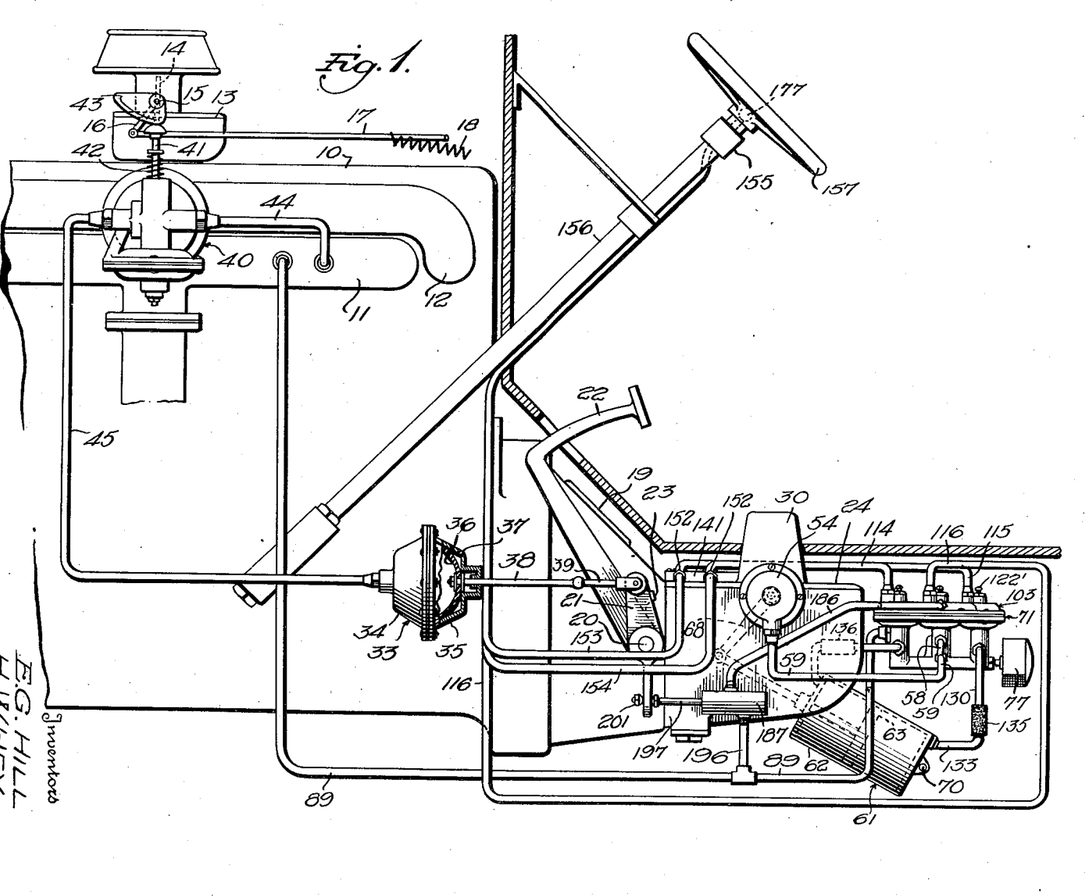
Figure 1 is a side elevation of a portion of a motor vehicle power plant, showing the invention applied.

Referring to Figure 1, the numeral 10 designates a motor vehicle engine having the usual intake manifold 11 and exhaust manifold 12. The intake manifold is provided with the usual carbureter 13 having a butterfly control valve 14 mounted on a shaft 15 operable by an arm 16. Suitable accelerator means is provided for operating the throttle arm 16. Such means includes a rod 17 provided with a return spring 18, and connected in any suitable manner to a conventional accelerator pedal (not shown).

The engine is provided with the usual clutch indicated as a whole by the numeral 19 and including the usual clutch plates (not shown) operable by a rock shaft 20. This shaft is provided with an arm 21 secured thereto, as shown in Figure 1. A clutch pedal 22 has its lower end freely mounted on the shaft 20 and provided with a lug 23 engageable with the arm 21 to actuate the latter upon depression of the clutch pedal.

Figure 2:
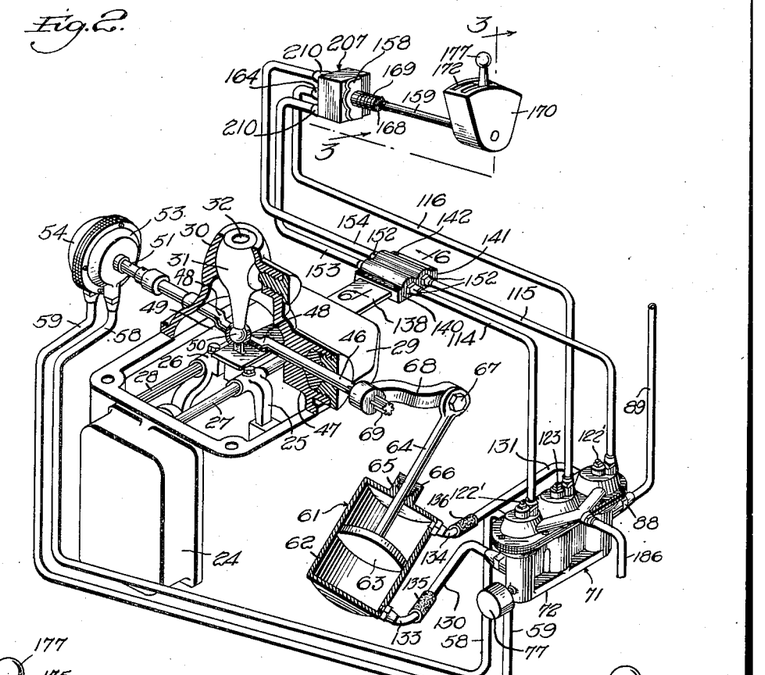
Figure 2 is a fragmentary perspective view of a portion of a motor vehicle gear set showing the operating and control means therefor together with the piping connections.

A gear set 24 is mounted rearwardly of the clutch and may be provided with conventional gears (not shown) shiftable by means of the usual forks 25 and 26 secured to the usual shift rods 27 and 28 respectively. The gear set in Figure 2 is shown looking angularly toward the forward end of the vehicle, and accordingly the shift rod 27 controls first and reverse gears while the shift rod 28 controls second and high gears. The casing of the transmission is provided with the usual cover 29 having an upwardly projecting portion 30 universally supporting a lever 31, corresponding to the lower portion of the usual conventional gear shift lever. It will be apparent that the upper portion of this lever is omitted, but the lever 31 may be provided with a socket 32 in its upper end for the reception of a rod when it is desired to operate the transmission conventionally. The lower end of the lever 31 engages the forks 25 and 26 in the usual manner to effect a change in forward driving ratio or to place the gear set in reverse gear.

It will become apparent that the present apparatus may be used in conjunction with a conventional foot operated clutch, but it readily may be used in connection with an automatic clutch control mechanism, and such mechanism has been generally illustrated in the drawings. Referring to Figure 1, the numeral 33 designates a differential pressure power device including casing sections 34 and 35 having a diaphragm 36 clamped therebetween, and the casing section 35 is vented to the atmosphere as at 37. A rod 38 is connected at its forward end to the diaphragm 36, and has its rear end connected by a cable or similar flexible element 39 to the upper end of the clutch arm 21.

Any suitable form of valve mechanism may be employed for controlling the power device 33, but it is preferred that the valve mechanism described and claimed in the patent to Edward G. Hill, No. 1,964,693, granted June 26, 1934, be employed. It will become apparent that the gear shifting mechanism to be described is not in any sense dependent for its operation on the particular type of control valve mechanism for the power device 33, since any control valve mechanism operative for actuating and deactuating the power device 33 may be employed. The valve mechanism is indicated as a whole by the numeral 40 and is indicated in Figure 1 as being operable by a stem 41 normally urged upwardly by a spring 42 and movable downwardly by a cam 43 secured to the throttle shaft 15.

The valve mechanism 40 is provided with a conduit 44 leading to the intake manifold 11, and is provided with a second conduit 45 leading to the casing section 34. When the valve mechanism and its operating elements are in the position shown in Figure 1, the throttle is partially opened and the power device 33 is deenergized, whereby the clutch elements are in operative engagement. Upon the closing of the throttle 14, the stem 41 is depressed by the cam 43 to connect the casing section 34 to the intake manifold through conduits 44 and 45.

Motion is transmitted to the shifting lever 31 by means of a shaft 46. This shaft extends transversely of the gear set and is journaled in bearings 47 carried thereby. An arm 48 is carried by the shaft 46 and terminates in a yoke 49 engaging a ball 50 formed on the lever 31. The shaft 46 is adapted to rock in its bearings, whereby the yoke 49 transmits forward and rearward movement to the lower end of the lever 31 to effect the shifting of the gears, as will be apparent. The shaft 46 is adapted to slide in its bearings to determine the lateral position of the lower end of the lever 31, in the same manner that such lateral movement is effected by a conventional transmission lever in selecting the proper gears.

Figures 11, 12, 13:
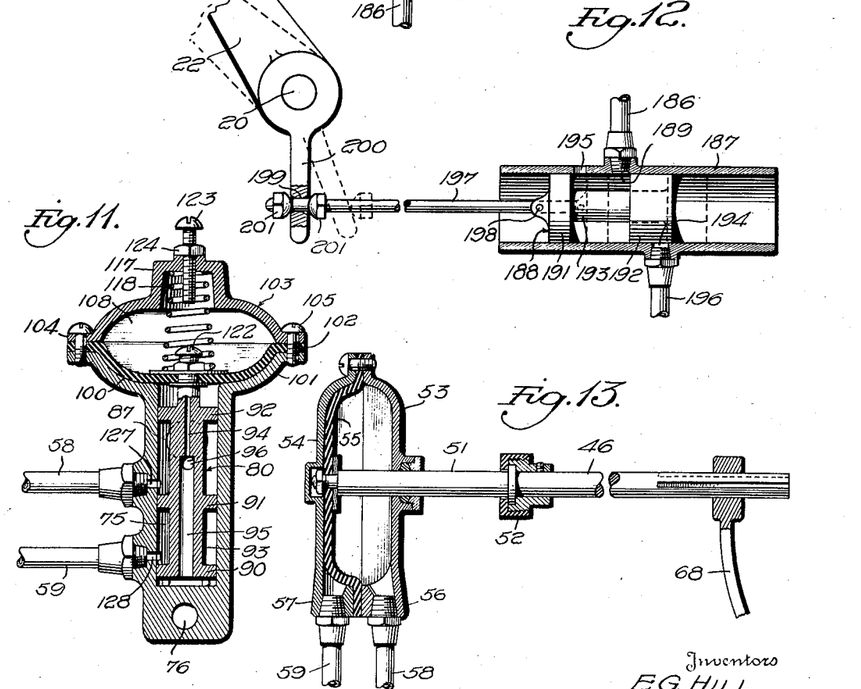

The means for effecting lateral movement of the lower end of the lever 31 by sliding the shaft 46 in its bearings is shown in detail in Figure 13 of the drawings. At the left hand end of the shaft 46, as viewed in Figure 13, a relatively short shaft 51 is arranged in axial alinement with the shaft 46 and is connected thereto by a suitable swivel 52. This swivel is provided to permit the rocking of the shaft 46 without transmitting similar movement to the shaft 51. The shaft 51 extends into one of a pair of casing sections 53 and 54 and a diaphragm 55 is clamped between the edges of these casing sections and secured to the adjacent end of the shaft 51.

The casing sections 53 and 54 are respectively provided with extensions 56 and 57 in which are tapped suitable unions for connecting the interior of the two casing sections to pipes 58 and 59 respectively. Means to be described are provided for connecting the respective casing sections to a source of vacuum and to the atmosphere through pipes 58 and 59 to slide the shaft 46 axially and thus move the lever 31 to determine which of the shift rods 27 or 28 is to be operated.

Referring to Figures 1 and 2 the numeral 61 designates a power device operative for rocking the shaft 46. In the present instance the power device is illustrated as comprising a cylinder 62 in which a piston 63 is reciprocable. A piston rod 64 is connected at one end to the piston 63 and extends through the adjacent end of the cylinder through a suitable bearing 65 preferably provided with a packing gland 66. The other end of the rod 64 is pivotally connected as at 67 to one end of an arm 68, and the other end of this arm is splined as at 69 to the adjacent end of the shaft 46. Accordingly rocking of the arm 68 is adapted to rock the shaft 46, and at the same time this shaft is slidable through the arm 68 by virtue of the splined connection 69. Obviously the rocking of the arm 68 must be compensated for by movement of the cylinder 62, and for this purpose the cylinder is provided with pivot means 70 supported with respect to any suitable portion of the vehicle.

Main control valve mechanism indicated as a whole by the numeral 71 is provided for controlling the operation of the piston 63 and for controlling the connection of the casing section 53 to the atmosphere or to a source of suction, such as the intake manifold 11. The main control valve mechanism is illustrated in detail in Figures 9, 10 and 11. This mechanism comprises a preferably cast body 72 having two relatively large vertical openings 73 and 74 extending downwardly thereinto adjacent the ends of the casing, and a similar vertical opening 75 is provided substantially centrally of the length of the casing. Each of the vertical openings 73 and 74 communicates at its lower end with a longitudinal passage 76 communicating with the atmosphere through any suitable type of air cleaner 77 to minimize the entrance of dust or other foreign material into the valve casing.

Figure 9:
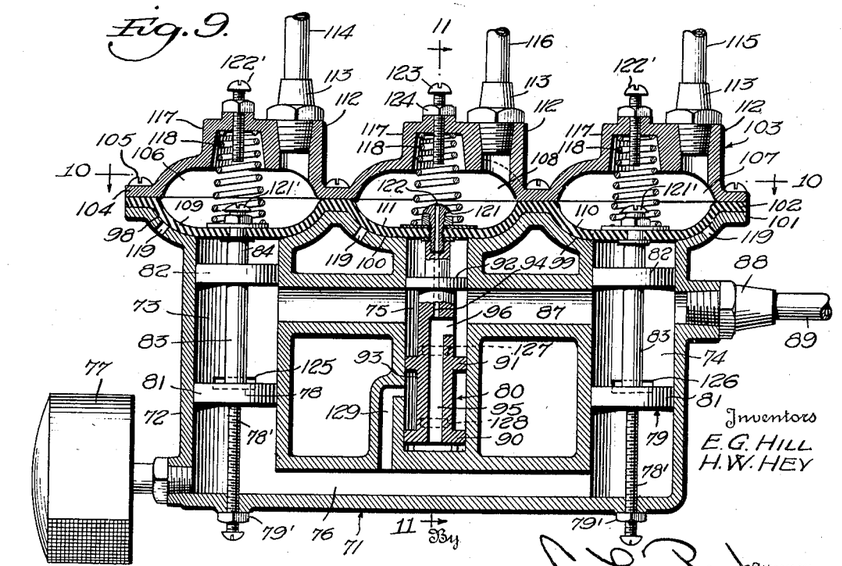
Figure 9 is a central vertical longitudinal sectional view through the main control valve mechanism.

The vertical openings 73, 74 and 75 are provided with valves respectively indicated as a whole by the numerals 78, 79 and 80. The valves 78 and 79 are identical with each other and only one need be described in detail. Referring to Figure 9, it will be noted that each of the valves 78 and 79 comprises a lower cylindrical head 81 and an upper similar head 82, and these heads are connected by a stem 83. This stem extends above the head 82 as indicated by the numeral 84 for a purpose to be described. A longitudinal passage 87 extends horizontally through the casing 72 and affords communication between the openings 73, 74 and 75, and at one end of the valve casing a union 88 is tapped into the passage 87 and is connected to one end of a pipe or conduit 89. The conduit 89 is connected to the intake manifold 11.

The valve 80 is somewhat different from the valves 78 and 79 and includes three heads 90, 91 and 92 respectively, preferably formed integral with a stem 93 which is somewhat heavier than the stems of the other two valves from the head 92 to the head 90. The upper end of the valve stem 93 may be reduced somewhat, as shown in Figures 9 and 11. The upper end of the valve stem 93 is provided with a restricted passage 94 communicating at its lower end with a substantially larger passage 95 which communicates with the space beneath the head 90. A transverse passage 96 communicates between the upper end of the passage 95 and the space between the valve heads 91 and 92.

The valve casing 71 is provided in its upper end with circular pockets or recesses 98, 99 and 100 arranged coaxially with respect to the valves 78, 79 and 80, respectively. To provide for the pockets referred to the top of the valve casing 72 is outwardly flanged as at 101. A flexible sheet 102 is arranged over the flange 101 and corresponds in shape and size thereto. A cap indicated as a whole by the numeral 103 is arranged over the flexible sheet 102 and has an outer flange 104 corresponding in shape and size to the flexible sheet 102. Screws 105 secure the cap to the valve casing, and these screws pass through the flanges 101 and 104 to clamp the sheet 102 therebetween.

The cap 103 is provided with circular recesses 106, 107 and 108, corresponding in position to the recesses 98, 99 and 100. The sheet 102 therefore forms three diaphragms 109, 110 and 111 movable in the pairs of recesses referred to. These three diaphragms are secured to the valve stems of the respective valves 78, 79 and 80. The pockets 106, 107 and 108 form chambers each of which communicates with the interior of a boss 112 formed integral with the cap 103, and a union 113 is tapped into each boss 112. Pipes 114, 115 and 116 are connected to the unions 113 to communicate with the respective chambers 106 and 107 and 108, and these pipes are adapted to be connected to the atmosphere in a manner to be described.

Each chamber 106, 107 and 108 is provided with an axial extension 117 in which is arranged the upper end of a spring 118, the lower end of each of these springs engaging its respective diaphragm to urge the latter downwardly. The passages 94 and 96 function to afford limited communication between the vacuum passage 87 and the chamber 108, and other means to be described similarly affords limited communication between chambers 106 and 107 and a source of partial vacuum. A bleed port 119 affords communication between the atmosphere and each of the chambers 98, 99 and 100, and accordingly it will be apparent that there is a tendency for the maintenance of differential pressure on opposite sides of the diaphragms 109, 110 and 111. In the absence of the operation of control means to be referred to, such differential pressure will hold each of the diaphragms in its uppermost position.

Figure 10:
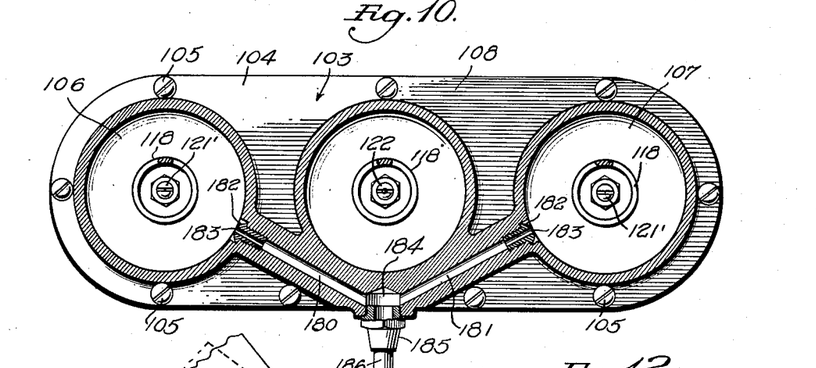
Figure 10 is a horizontal sectional view on line 10—10 of Figure 9.

Referring to Figure 10, the numerals 180 and 181 designate passages formed in the head 103 and communicating with the chambers 106 and 107 through screws 182 having drilled openings 183 therethrough. These screws are replaceable with screws having different sized openings therethrough to govern the degree of communication between the passages 180 and 181 and the respective chambers 106 and 107. The passages 180 and 181 communicate at their adjacent ends with a recess 184 in the outer end of which is tapped a union 185 having a pipe 186 connected thereto.

In Figure 12 of the drawings a lock out valve is illustrated as being controlled by the clutch pedal. This valve comprises a cylindrical casing 187 in which a valve 188 is slidable. The valve casing is provided with a port 189 having the pipe 186 connected thereto. The valve 188 comprises a pair of heads 191 and 192 connected by a stem 193, and the valve normally occupies the solid line position shown in Figure 12. The valve is movable to the dotted line position shown, and in either position of the valve it will be noted that the port 189 communicates with the space between the heads 191 and 192. The valve is also provided with an atmospheric port 195 communicating with the space between the heads 191 and 192 when the valve is in the solid line position shown in Figure 12.

An operating rod 197 is provided for the valve 188 and is pivotally connected thereto as at 198. The other end of the rod 197 projects through an opening 199 formed in a depending arm 200 preferably formed integral with the clutch pedal. Nuts 201 are threaded on the rod 197 to prevent movement thereof with respect to the arm 200. When the clutch is disengaged, the pedal 22 occupies the dotted line position shown in Figure 12 in which case the port 194 communicates with the space between the heads 191 and 192, and consequently with the port 189, thus connecting the chambers 106 and 107 to the intake manifold, the degree of communication being restricted by the orifices 183. When the clutch is engaged, the pedal 22 is in the solid line position shown in Figure 12, in which case the port 194 is closed by the head 192.

From the foregoing it will be apparent that means are provided for normally tending to retain a partial vacuum in the chambers 106, 107 and 108, and as previously stated, the rate of communication between the chambers 106 and 107 with the source of partial vacuum may be governed in accordance with the sizes of the passages 183 in the screws 182. Similar means may be provided for restricting communication between the chamber 108 and the passage 87. Referring to Figure 9 it will be noted that a screw 121 is employed for securing the diaphragm 111 to the upper end of the valve stem 93, and this screw is provided with a restricted passage 122 therethrough communicating at opposite ends with the passage 94 and the interior of the chamber 108.

The screw 122 is adapted to engage the lower end of a screw 123 threaded in the central axial extension 117 and secured in position by a lock nut 124. This means adjustably limits the upward movement of the valve 180. Similar means is provided for limiting the upward movement of the valves 78 and 79, screws 121' being employed for securing the diaphragms 109 and 110 to their respective valve stems and being engageable with the lower ends of adjusting screws 122'.

The cylindrical openings 73 and 74 are provided with ports 125 and 126 respectively, as shown in Figure 9, and the opening 75 is provided with a pair of ports 127 and 128 arranged respectively above the valve heads 91 and 90 when the valve 80 is in the position shown in Figure 9. The space between the valve heads 90 and 91 is in constant communication with the atmosphere through a port 129 which may directly communicate with the atmosphere but which preferably communicates with the air passage 76 having the air cleaner associated therewith. The ports 125 and 126 are respectively connected to pipes 130 and 131, while the ports 127 and 128 are respectively connected to the pipes 58 and 59 previously described. These several pipes may be connected to the valve casing by means of suitable unions, as shown, for example in connection with the pipes 58 and 59 in Figure 11 of the drawings.

As is generally well known, it is preferred that the movement of the shifting mechanism into either of its four positions should take place relatively slowly, although movement of the lever 31 out of any of its positions may take place as rapidly as desired. The present apparatus contemplates such a mode of operation, and for the purpose of somewhat retarding the shifting movement at the proper time, the effective area of the ports 125 and 126 is preferably limited when the valves 78 and 79 move to their lower positions. This may be accomplished by providing the bottom of the valve casing 72 with set screws 78' adapted to be locked in selected positions by lock nuts 79'. It will be apparent that when the valves 78 and 79 move upwardly, their respective ports 125 and 126 are wholly uncovered, but when these valves move downwardly, the ports 125 and 126 are only partially uncovered, and this operation of the valves 78 and 79 is taken advantage of for limiting the speed of the shifting movement as the shift lever 31 moves into either of its four positions.

Referring to Figure 2 it will be noted that the cylinder 62 is provided adjacent its ends with pipe connections 133 and 134, connected to the respective pipes 130 and 131 by flexible tubes 135 and 136, the obvious purpose of these tubes being to permit swinging movement of the cylinder upon rocking movement of the arm 68.

Figure 6:
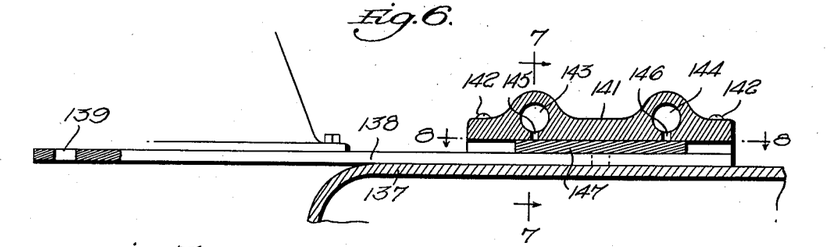
Figure 6 is a vertical sectional view through the gear set operated valve, taken substantially on line 6—6 of Figure 2.
Figure 7:
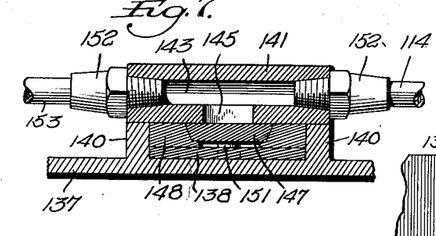
Figure 7 is a detail transverse sectional view on line 7—7 of Figure 6.

Referring to Figures 2 and 6, the numeral 137 designates the top portion of the transmission housing adjacent the clutch, and this portion of the housing supports a horizontal slide 138 extending into the transmission housing and provided with an opening 139 through which the lever 31 projects, just below the ball 40. It will be apparent that the opening 139 is of such a length transversely of the slide 138 as to permit lateral movement of the lower end of the shift lever 31 to selectively engage the forks 25 and 26 without transmitting any lateral movement to the slide 138. It will be apparent that this slide is movable longitudinally however, when the lower end of the shift lever 31 moves forwardly and rearwardly.

Figure 8:
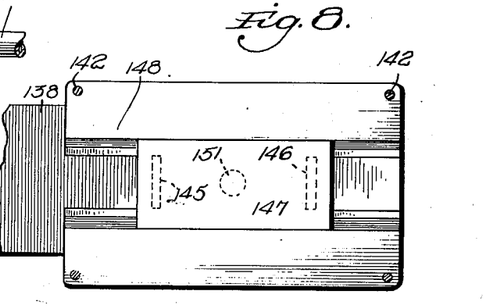
Figure 8 is a horizontal sectional view on line 8—8 of Figure 6.

The top plate 137 is provided with upstanding flanges 140, and a valve cap 141 is secured against the upper edges of these flanges by screws 142. The cap 141 is provided with a pair of transverse passages 143 and 144 extending therethrough, and these passages are provided with downwardly opening ports 145 and 146, as clearly shown in Figure 6. These ports are shown in broken lines in Figure 8 to indicate their relative positions with respect to a slide valve 147 which governs the opening and closing of the ports. The valve 147 is slidable in guides 148 secured against the bottom of the cap 141. It will be apparent that the valve 147 is somewhat longer than the distance between the remote edges of the ports 145 and 146. This valve is provided substantially centrally thereof with a depending lug 151 engageable in a similarly shaped opening formed in the slide 138. It will be apparent that longitudinal movement of the slide is adapted to transmit similar movement to the valve 147.

It will become apparent that the valve 147 is operative for stopping the shift lever 31 in neutral position, and it is also operative when the motor piston 63 reaches each end of its stroke for stopping the piston and preparing it for movement in the other direction. This action is accomplished by controlling the exhausting of air from the diaphragm chambers 106 and 107. Each end of each of the passages 143 and 144 is provided with a union 152 tapped thereinto. The unions 152 at one side of the cap 141 are connected respectively to the pipes 114 and 115, and these pipes, as previously described, communicate respectively with the chambers 106 and 107, as shown in Figure 11. The unions 152 at the opposite side of the cap 141 are connected respectively to pipes 153 and 154.

Figure 3:
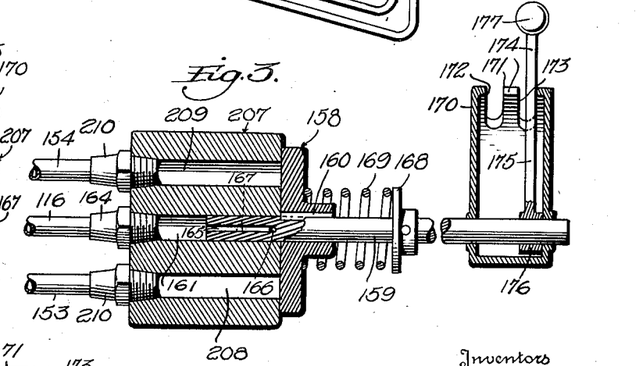
Figure 3 is a sectional view taken substantially on the plane indicated by the line 3—3 in Figure 2.
Figure 4:
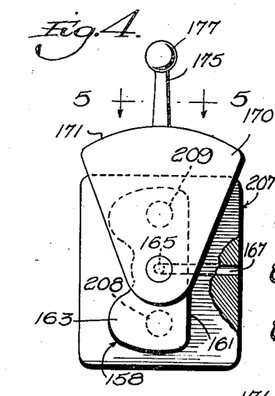
Figure 4 is an end elevation of the control lever and associated elements.

A novel manually controlled valve mechanism is provided for controlling communication between the pipes 116, 153 and 154, and the atmosphere. This valve mechanism is preferably located adjacent the steering wheel of the vehicle and may be contained within a suitable housing 155 secured to the steering column 156 having the usual steering wheel 157 at its upper end. The housing 155 extends laterally from the steering post, as will become apparent, but it is not essential to the present invention that any particular type of housing be employed. Referring to Figures 2, 3 and 4, the numeral 207 designates a valve housing having a pair of passages 208 and 209 extending therethrough and connected to the respective pipes 153 and 154 by suitable unions 210.

A valve 158 seats against the end of the valve casing 207 remote from the connections of the pipes 194 and 195, as shown in Figure 3. This valve is splined on a shaft 159, as at 160, and the shaft 159 extends into an opening 161 arranged parallel to the openings 208 and 209. The valve 158 has a straight edge 162, and when the valve is in the vertical position shown in Figure 4, both passages 208 and 209 are closed. The valve is adapted to be rocked in a counter-clockwise direction as viewed in Figure 4 to uncover the port 209 and in a clockwise direction to uncover the port 208. The valve has circumferentially elongated portions 163 each of which functions to maintain one of the passages closed while the other is opened upon rotation of the shaft 159. One end of the opening 161 constitutes a passage to which the pipe 116 is connected by a union 164.

The shaft 159 is provided in its inner end with an axial passage 165 terminating in a transverse opening 166. The valve housing 207 is provided with a transverse opening 167, communicating with the atmosphere as shown in Figure 4. As previously stated, the shaft 159 is splined to the valve 158, and the shaft is axially slidable in the opening 161, under conditions to be described, to bring the port 166 into registration with the passage 167. This action, therefore, connects the pipe 116 to the atmosphere.

A collar 168 is secured to the shaft 159 at a point spaced from the valve 158 and a light coil spring 169 has one end seating against the collar 168 and its opposite end against the valve 158 to maintain the latter on its seat regardless of the longitudinal position of the shaft 159 with respect to the valve 158. The shaft 159 extends into the lower portion of a segmental housing 170 having an arcuate upper face 171. The arcuate face 171 is provided with relatively long parallel slots 172 and 173 connected centrally of their length by a transverse slot 174. A small lever 175 has a collar 176 at its lower end secured to the shaft 159 and an operating handle, preferably in the form of a ball 177, is arranged on the upper end of the lever 175. The collar 176 is engageable against the wall of the casing 170 remote from the collar 158, to limit the movement of the shaft 159 toward the right as viewed in Figure 3.

When the collar 176 is in the position described, the lever 175 substantially contacts with the outer edge of the slot 173, and opposite the transverse slot 174, the slot 173 is preferably provided with slightly extended portions 178 forming a small notch 179 therebetween to assist the operator in locating the neutral position of the lever 175, as will become apparent. The parts of the device shown in Figure 3 are in a position corresponding to the position in which the driver of a vehicle would view them. The lever 175 partakes of movement corresponding to the conventional movements of a standard gear shift lever, and when the lever 175 is in the slot 173, the lever may be moved forwardly to place the gear set in second gear and rearwardly to place it in high gear. Obviously the spring 169 biases the lever 175 toward the second and high gear side of the segmental casing 170.

The operation of the apparatus is as follows:

So far as the operation of the gear shift mechanism is concerned, it may be considered that the clutch operating mechanism operates in accordance with any of the known types of clutch control mechanisms, such, for example, as the mechanism disclosed in the prior patent to Edward G. Hill, No. 1,964,693, referred to above. When the throttle 14 is at least partially opened, the high point of the cam 43 will be moved away from the upper end of the stem 41, and upward movement of this stem disconnects the pipe 45 from the vacuum pipe 44 and connects the pipe 45 to the atmosphere. Under such conditions the car may be operated in the usual manner and the clutch elements will be in operative engagement. When the throttle is moved to closed position, the high point of the cam 43 depresses the stem 41 and under such conditions the pipe 45 will be disconnected from the atmosphere and connected to the pipe 44. Thus it will be apparent that the power device 33 will be connected to the intake manifold and will be energized by differential pressure to effect clutch disengagement.

It will become apparent that the operation of the gear shifting motor 61 is dependent upon the previous disengagement of the clutch either manually or by the operation of the power device 33, and the operation of the control valves governing the motor 61 can have no effect thereon except when the clutch is disengaged. In other words, when the vehicle is in normal operation with the clutch engaged, no differential pressure can be built up in the motor 61 to affect the positions of the gears and the knob 177 may be moved back and forth between any of its positions without causing any gear shifting operation to take place. This is important as a matter of safety since it is impossible to shift gears except when the clutch is disengaged, and it moreover permits the preselection of gears without awaiting the disengagement of the clutch. This operation forms the principal feature of the present invention and will be referred to in detail later.

The present apparatus permits the motor to be stopped with the gears in neutral position, thus permitting the vehicle motor to be started at any time without depressing the clutch pedal. Assuming that the motor has been started with the gears in neutral position and with the throttle in idling position, it will be apparent that the clutch will be disengaged through the operation of the power device 33, and the passage 87 will be in communication with the intake manifold through the pipe 89. Assuming that the lever 175 (Figures 3, 4 and 5) is arranged in the small notch 179, the shaft 159 will be in the position shown in Figure 3 with the air port 167 closed.

Under such conditions, the center diaphragm chamber 108 will be disconnected from the atmosphere since the pipe 116 will be closed to the atmosphere by the valve stem 159. Since the chamber 108 communicates with the vacuum passage 87 through the valve passages 94 and 96, differential pressure will be maintained on opposite sides of the diaphragm 111 to hold this member upwardly against the tension of the spring 118. Under such conditions the valve head 91 (see Figures 9 and 11) will be arranged above the port 127, while the valve head 90 will be arranged above the port 128. Thus the port 127 will be connected to the atmosphere through the passage 129, while the port 128 will be connected to the source of partial vacuum through the lower end of the passage 95 and through the vacuum passage 87.

The ports 127 and 128 communicate respectively with the pipes 58 and 59 leading to the interior of the casing sections 53 and 54 respectively. Since the port 127 is connected to the atmosphere it will be apparent that atmospheric pressure will be present in the casing section 53, the other casing section 54 being connected to the source of vacuum through the pipe 59, port 128 and passage 95. Therefore the diaphragm 55 will be retained in the position shown in Figure 13 thus holding the lower end of the shift lever 31 toward the left as viewed in Figures 2 and 13, the lever 31 therefore being held at the second and high gear side of the gear set.

Under the conditions being considered, that is, with the clutch disengaged and with the lever 175 arranged in the notch 179, both valve passages 208 and 209 (see Figures 3 and 4) will be closed to the atmosphere. Referring to Figure 12 it will be noted that when the clutch is disengaged the valve 188 will be in the dotted line position, thus connecting pipes 186 and 196. The pipe 186 communicates with the two chambers 106 and 107 through the passages 180 and 181 shown in Figure 10, while the pipe 196 is always connected to the source of partial vacuum, namely, the intake manifold of the engine, by means of the pipe 89. With the clutch disengaged, therefore, a partial vacuum will be maintained in the chambers 106 and 107 and since the pipes 114 and 115 are closed to the atmosphere by the valve 162, as previously explained, differential pressure will exist on opposite sides of the diaphragms 109 and 110 to hold these members and their associated valves in their upper positions. The lower valve head 81 will thus be arranged above the ports 125 and 126 and since these ports communicate with the motor cylinder 62 it will be apparent that both ends of the cylinder will be connected to the atmosphere by means of the atmospheric passage 76. Accordingly the piston 63 will remain in its intermediate position, corresponding with the neutral position of the gears, with full atmospheric pressure present on opposite sides of the piston 63.

Assuming that the driver desires to place the gear set in second gear, under which conditions modern motor vehicles can be readily started in motion under most conditions, it merely is necessary for the operator to push the knob 177 forwardly in the slot 173 to the second gear position. Referring to Figure 4, it will be apparent that this operation rotates the valve 158 in a clockwise direction, thus opening passage 208 and connecting the pipe 153 to the atmosphere. This pipe communicates through the gear set valve passage 143 with the pipe 114 leading to the diaphragm chamber 106, and accordingly this chamber will be opened to the atmosphere.

The spring 118 thus immediately moves the valve 78 to its lower position, as shown in Figure 9, thus disconnecting the port 125 from the atmosphere and connecting it to the passage 87, and since the port 125 communicates with the rear or lower end of the cylinder 62 through the pipe 130, it will be apparent that differential pressure will move the piston 63 downwardly and rearwardly. Downward movement of the valve 78 is limited by its associated screw 78' to only partially uncover the port 125 for a purpose to be described. It will be recalled that the valve 79 will still be in its upper position whereby the port 126, and consequently the forward end of the cylinder 62, will be connected to the atmosphere. The action referred to swings the arm 68 in a clockwise direction as viewed in Figure 2, thus causing the shift lever 31 to be operated to move the shift fork 25 rearwardly to place the gear set in second gear.

As the shift lever 31 moves rearwardly, movement is transmitted to the slide 138 (see Figure 6) thus correspondingly moving the valve 147. When the second gear position is reached, the valve 147 will uncover the port 146 thus opening the passage 144 to the atmosphere through the space beneath the cap 141 forwardly of the valve 147. The opening of the port 146 therefore connects the pipe 115, and consequently the diaphragm chamber 107, to the atmosphere thus establishing pressure equalization on opposite sides of the diaphragm 110. The associated spring 118 thereupon moves the valve 79 downwardly into engagement with the upper end of the screw 78', thus partially uncovering the port 126 to connect the vacuum passage 87 to the pipe 131. Air thus will be exhausted from the upper end of the cylinder 62 and the partial vacuum thus established will be equal to the partial vacuum already existing in the lower end of the cylinder 62, and thus the piston 63 will remain in the lower end of the cylinder 62, corresponding to the second gear position, since no differential pressure is present in the cylinder to tend to move the piston 63. Thus it will be apparent that the piston 63 will be "vacuum suspended" in the lower end of the cylinder 62, that is, it will be subjected to identical partial vacuums on opposite sides so that it has no tendency to move out of its position. This "vacuum suspension" however, greatly facilitates the next operation of the piston 63.

With the gear set thus in second gear the operator may depress the accelerator pedal to accelerate the motor speed and release the clutch elements for movement into engagement in accordance with the functioning of the valve mechanism 40, assuming that an automatic clutch control mechanism is employed. The vehicle will thus start to move forwardly and the usual operation of depressing the accelerator pedal is continued until proper vehicle momentum is attained. When the clutch elements come into engagement the clutch pedal 22 will assume the position shown in solid lines in Figure 12, in which case the head 192 will close the vacuum port 194 while the head 91 will open the atmospheric port 195 to communication with the pipe 186 and thus connect the chambers 106 and 107 to the atmosphere. The springs 118 in the chambers 106 and 107 will thus retain their associated valves in their lower positions previously described and movement of the gear shifting lever 175 to control communication from the pipes 114 and 115 to the atmosphere cannot affect the pressures of the chambers 106 and 107. The piston 63 of the shifting motor will thus remain "vacuum suspended" since the ports 125 and 126 will remain in communication with the source of partial vacuum through the passage 87.

After the vehicle has gained sufficient momentum in second gear the operator may release the accelerator pedal to effect automatic declutching, or may depress the clutch pedal, preparatory to the shift into high gear. The clutch pedal will then move the valve 188 (Figure 12) to the dotted line position to close the atmospheric port 195 and open the vacuum port 194, thus again establishing restricted communication between the chambers 106 and 107 and the source of partial vacuum. The operation of the valves 78 and 79 will then be restored to control by the valve 158. It will be apparent that preselection of high gear may have taken place by the movement of the lever 175 prior to declutching, or after the clutch has been disengaged the lever 175 may be moved to high gear position.

Assuming that the knob 177 has been moved to the high gear position and the clutch is disengaged, the piston 63 will move upwardly and forwardly to effect the shift into high gear. The movement of the knob 177 referred to causes the valve 158 to close the port 208 and open the port 209 to the atmosphere. It will be recalled that when the shift lever 31 reached second gear position, the slide valve 147 uncovered the port 146 to connect the pipe 115 to the atmosphere. While the movement of the knob 177 to high gear position opens the port 209 to the atmosphere, this action obviously will not affect the diaphragm chamber 107 since this chamber had been previously connected to the atmosphere through the slide valve port 146.

However, the movement of the lever 175 to high gear position rotates the valve 158 to close the port 208, thus closing the diaphragm chamber 106 to the atmosphere. It will be obvious that the slide valve 147 will have been moved toward the left from the position shown in Figure 6 to maintain the port 145 closed. Since the air will be exhausted from the diaphragm chamber 106 in view of the position of the valve 188 (see Figure 12) atmospheric pressure will act against the bottom of the diaphragm 109 to move it upwardly and thus similarly move the valve 78 to open the port 125 to the atmosphere through the passage 76.

The action referred to closes the port 125 to the vacuum passage 87 and simultaneously opens the lower end of the cylinder 62 to the atmosphere. The upper end of the cylinder 62 will have been previously connected to the intake manifold when the gears reach second gear position, as previously explained. Accordingly atmospheric pressure will act on the lower end of the piston 63 to move it upwardly and forwardly, thus swinging the arm 68 in a counter-clockwise direction as viewed in Figure 2 and the shift fork 25 will be moved toward high gear position. As previously stated, the movement of the gears to second gear position caused the slide valve 147 to uncover the port 146. Opposite movement of the valve 147 will take place when the shift is made into high gear, the slide valve being moved forwardly to open the port 145 to the atmosphere. This action results in connecting the chamber 106 to the atmosphere independently of the position of the valve 158, whereupon the associated spring 118 moves the valve 78 downwardly to again connect the port 125 to the vacuum passage 87. As soon as the piston 63 reaches its upper position, therefore, it will become suspended, ready for the next shifting operation.

From the foregoing it will be apparent that the connection between the two ends of the cylinder 62 to the source of partial vacuum takes place upon the upward movement of the respective diaphragms 109 and 110, and this action, in turn, takes place by closing the respective pipes 114 and 115 to the atmosphere, under which conditions air will be exhausted from the space above the diaphragms referred to, by means of the passages 180 and 181. This feature is of substantial importance from a practical standpoint, since it will be apparent that only two pipes, namely, the pipes 153 and 154, need extend to the valve housing 207 adjacent the steering wheel to control the piston 63. In other words, it is unnecessary to use two pipes for each end of the cylinder 62, one connected to the atmosphere and the other to the source of vacuum. Thus the installation and operation of the apparatus are greatly simplified. Moreover, it will be apparent that the vacuum suspension of the piston 63 in either of its end positions permits extremely rapid operation since it is merely necessary to admit atmospheric pressure into one end of the cylinder 62 to effect movement of the piston 63.

From the foregoing it will be apparent that the operator may shift between second and high gears merely by leaving the knob 177 in its biased position toward the right side of the segmental housing 170 and moving the knob back and forth between second and high gear positions. The shift lever 31 may be moved to neutral position and permitted to remain indefinitely in such position. The placing of the gears in high gear position has been described in detail, and assuming that the driver now desires to stop the vehicle with the gears in neutral position, it merely is necessary for the operator to move the knob 177 to the intermediate position shown in Figure 5. Neutral position may be preselected while the engine is still propelling the vehicle. Assuming that this is done, it will be apparent that the valve 158 will be moved to the neutral position shown in Figure 4, both passages 208 and 209 being closed. While this action closes both pipes 114 and 115 to the atmosphere, both diaphragm chambers 106 and 107 will be open to the atmosphere through passages 180 and 181, pipe 186 and ports 189 and 185 (see Figures 10 and 12). The valve 158 thus cannot control the valves 78 and 79 when the clutch is engaged, and the springs 118 in the chambers 106 and 107 will retain the associated valves in their lowermost positions, thus vacuum suspending the piston 63.

As soon as the clutch is disengaged, however, the valve 188 will connect the chambers 106 and 107 to the source of partial vacuum in the manner referred to. Both of the chambers 106 and 107 will be thus disconnected from the atmosphere so far as the valves 158 and 188 are concerned, but since the vehicle has been traveling in high gear the port 145 (Figure 6) will have been opened to the atmosphere, thus preventing the building up of a differential pressure on opposite sides of the diaphragm 109. The valve 78 will thus remain in its lower position connecting the lower end of the cylinder 62 to the source of vacuum, but air will be exhausted from the chamber 107 by virtue of the position of the valve 188, and accordingly the diaphragm 110 will move upwardly to cause the valve head 81 of the valve 79 to move above the port 126. Thus the upper end of the cylinder 62 will be connected to the atmosphere and the piston 63 will immediately move out of high gear position.

Movement of the gears out of high gear position transmits movement to the slide valve 147, this valve moving toward the left as viewed in Figure 6 until it reaches the neutral position shown with both of the ports 145 and 146 closed. Thus the chamber 106 will be disconnected completely from the atmosphere but will be in communication with the source of vacuum through the passage 180, pipe 186, etc., and a differential pressure will be quickly built up on opposite sides of the diaphragm 109, thus moving the valve 78 to its upper position to connect the port 125 and consequently the lower end of the cylinder 62, to the atmosphere. This action takes place when the piston 63 reaches its intermediate or neutral position, and the piston will stop in such position with atmospheric pressure present in both ends of the cylinder 62.

It will be apparent that so long as the gear set remains in neutral position both of the slide valve ports 145 and 146 will be closed to the atmosphere, and so long as the knob 177 remains in the position shown in Figure 4, both of the ports 208 and 209 will be similarly closed to the atmosphere. Thus a partial vacuum will be maintained indefinitely in the chambers 106 and 107 to hold the valves 78 and 79 in their upper positions to connect both ends of the cylinder 62 to the atmosphere.

The foregoing description contemplates the operation of the apparatus between second and high gear positions, and movement to low and reverse gear positions may be accomplished with equal facility. As previously stated the lever knob 177 is biased toward the right as viewed in Figure 3, and accordingly the ports 166 and 167 are normally out of registration with each other. This being the case, the chamber 108 (Figures 9 and 11) is closed to the atmosphere at all times when the lever knob 177 is operating at the second and high gear side of the casing 170. Under such conditions the chamber 108 will remain in restricted communication with the source of vacuum through the passage 94 and the passage 122 in the screw 121, and the diaphragm 111 will be held in its upper position. The valve 80 also will be held in its upper position, in which case the port 127 communicates with the space between the valve heads 90 and 91, while the port 128 is connected to the source of partial vacuum through the valve passages 95 and 96.

As previously stated, the port 127 is connected to the pipe 58 (Figures 9 and 11) leading to the diaphragm chamber 53 (Figure 13) while the port 128 is connected to the pipe 59 leading to the vacuum casing 54. With the valve 80 remaining in its upper position when the lever knob 177 is at its biased side, therefore, the diaphragm 55 will remain in the position shown in Figure 13, thus holding the lower end of the shift lever 31 toward the left as viewed in Figure 2, thus retaining it in a position to shift the second and high gear shift rod 28.

Figure 5:
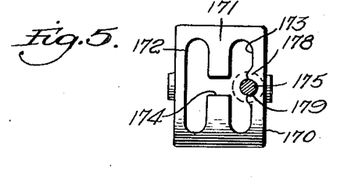
Figure 5 is a detail sectional view on line 5—5 of Figure 4.

Assuming that the lever knob 177 is in the neutral position shown in Figures 4 and 5 and it is desired to shift into reverse gear, the operator may move the knob 177 through the transverse slot 174 and then forwardly in the slot 172. The movement of the knob 177 toward the left brings the valve port 166 (Figure 3) into registration with the port 167 thus opening the pipe 116 and the chamber 108 to the atmosphere. The associated spring 118 will immediately move the diaphragm 111 to its lower position shown in Figure 9, whereupon the port 127 will be opened to the source of partial vacuum while the port 128 will be opened to the atmosphere. This action connects the diaphragm chamber 54 (Figure 13) to the atmosphere and connects the casing 53 to the source of partial vacuum, thus moving the rod 51 and rock shaft 46 toward the right as viewed in Figures 2 and 13 to place the lower end of the lever 31 in position to operate the low and reverse gear shift rod 27.

If the knob 177 has been moved forwardly with the lever 175 in the slot 172, the gears will be shifted into reverse, and the operation of the valves 78 and 79 will be identical with the operation previously described for second gear. Similarly, if the knob 177 is moved rearwardly at the low and reverse gear side, the valves 78 and 79 will operate in the manner described in connection with high gear, and will place the gear set in low gear by transmitting movement to the shift rod 27. In other words, the piston 63 of the shifting motor moves in accordance with the forward and rearward movement of the shift knob 177 regardless of the transverse position of this knob, the transverse position of the knob determining which of the shift rods 27 or 28 is operated.

In our copending application Serial No. 15,904, previously referred to, a spring is employed for biasing the rock shaft 46 to the second and high gear side, and the tension of such spring was adapted to be overcome by vacuum operated means. While such apparatus was perfectly satisfactory in operation the present apparatus is somewhat advantageous for the reason that it provides a slightly faster operation in shifting to the first and reverse gear side. In the prior construction the biasing spring was relatively instantaneous in functioning, whereas there was a slight loss in time in effecting movement of the shaft 46 to the low end reverse gear side due to the fact that it was necessary for the vacuum operated device to build up a differential pressure sufficient to overcome the tension of the biasing spring before movement of the shaft 46 would take place. With the present apparatus there is no biasing of the shaft 46, and the single valve 80 determines the transverse position of the shifting lever 31. This single valve is so quickly responsive to movement of the knob 177 that shifting from one side of the gear set to the other is accomplished substantially instantaneously.

The apparatus is operative for moving the gear set from any position to any other position provided the clutch has been disengaged, and the apparatus is also operative for permitting preselection between any two gear positions which require movement of the knob 177 between extreme forward and rear positions. For example, preselection may take place between second and high gears or it may take place between first and second gears. In the latter case the knob 177 will be moved from the rear end of the slot 172 to the center thereof, and then laterally through the slot 174 and forwardly in the slot 173. In the former case, assuming that the knob 177 has been moved before the clutch is disengaged, the valves 78 and 79 will remain in their normal positions shown in Figure 9 until the clutch has been disengaged. This is due to the fact that the pipes 114 and 115 are disconnected from the source of vacuum by the valve 188 (Figure 12) until the clutch is disengaged. Upon disengagement of the clutch, the valves 78 and 79 will function in the manner previously described, and the shift will be made from second to high gear.

Assuming that preselection is made from first to second gear, the lateral movement of the knob 177 will disconnect the valve ports 166 and 167 (Figure 3) thus tending to move the rock shaft 46 axially toward the second and high gear side. Such movement cannot take place, however, until the clutch is disengaged, whereupon the valves 78 and 79 will function to move the motor piston 63 downward. The shaft 46 having been previously biased toward the right as viewed in Figure 2, such movement will take place as soon as the intermediate position is reached, whereupon the piston 63 will continue its movement to place the gear set in second gear. In our copending application referred to we have disclosed means for providing preselection of any gear from any other gear, as for example, from first to high gears. Such means may be used in connection with the present construction as will be obvious from the disclosure of the copending application referred to, and such means has been omitted from the present application for the reason that it is not essential for the operation of the present invention.

From the foregoing it will be apparent that the present invention provides an efficient "lockout" which operates automatically to prevent the shifting of the gears when the clutch is in engagement, and such means does not employ any mechanical means for locking the gears in position.

Assuming that the gear set has been placed in any operative position, both of the valves 78 and 79 will be biased to the positions shown in Figure 9, thus "vacuum suspending" the piston 63 to facilitate the rapid movement of the apparatus upon the next gear selection. Such selection, however, cannot be made effective while the clutch is engaged since the valve 188 retains both of the diaphragm chambers 106 and 107 open to the atmosphere, thus rendering the valve 158 inoperative since no differential pressure can be built up on opposite sides of the diaphragms 109 and 110. Moreover, since the valves 78 and 79 are biased to the positions shown in Figure 9 with the ports 125 and 126 open to the source of partial vacuum, the "vacuum suspension" of the piston 63 will remain effective indefinitely until the parts again function to shift the gears.

The second feature of the present construction over the structure shown in our copending application lies in the provision of means for eliminating the biasing of the rock shaft 46 to the second and high gear side of the gear set. A single valve is employed for operating the diaphragm 55 and such valve is controlled by a single pipe 116 leading to the valve housing 207. Thus it will be apparent that all of the numerous functions of the apparatus may be controlled entirely by the three pipes 116, 153 and 154 leading to the valve housing 207, and no electrical control circuits whatever are necessary for controlling any of the parts of the apparatus.

Where the expression "source of pressure differential" occurs in the claims, this expression is intended to define a source of pressure which is different from that of the atmosphere whereby the connection of such source to the devices operable by differential pressure will result in the generation of the necessary differential pressure for operating such devices.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A gear shifting mechanism for a motor vehicle having a clutch and a transmission, comprising a differential pressure operated gear shifting mechanism, a source of pressure differential therefor, a plurality of control devices for said mechanism, means for selectively actuating said control devices, and means for rendering said last named means inoperative when the clutch is in engagement while connection between said shifting mechanism and said source is maintained.

2. A gear shifting mechanism for a motor vehicle having a clutch and a transmission, comprising a power operated gear shifting mechanism, a plurality of control devices for said mechanism, fluid pressure operated means for selectively actuating said control devices, and means connected to the clutch for rendering said last named means inoperative when the clutch is in engagement.

3. A gear shifting mechanism for a motor vehicle having a clutch and a transmission, comprising a differential pressure operated gear shifting mechanism, a source of pressure differential therefor, a plurality of control valves for said mechanism, selectively operable means for actuating said control valves, and means for preventing operation of said selectively operable means when the clutch is in engagement while connection between said shifting mechanism and said source is maintained.

4. A gear shifting mechanism for a motor vehicle having a clutch and a transmission, comprising a differential pressure operated gear shifting mechanism, a source of pressure differential therefor, a plurality of control valves for controlling said mechanism, selectively operable means for actuating said control valves, and means operative when the clutch is in engagement for preventing the operation of said selectively operable means without affecting connection of said shifting mechanism to said source.

5. A gear shifting mechanism for a motor vehicle having a clutch and a transmission, comprising a differential pressure operated gear shifting mechanism, a source of pressure differential therefor, a plurality of control valves for controlling said mechanism, selectively operable differential pressure operated means for actuating said control valves, and means for preventing the establishment of differential pressure in said last named means when the clutch is in engagement without affecting connection of said shifting mechanism to said source.

6. A gear shifting mechanism for a motor vehicle having a clutch and a transmission, comprising a differential pressure operated gear shifting mechanism, a plurality of control valves for controlling said mechanism, selectively operable differential pressure operated means for actuating said control valves, and fluid pressure means connected to the clutch for preventing the establishment of differential pressure in said last named means.

7. A gear shifting mechanism for a motor vehicle having a clutch and a transmission provided with shifting means, comprising a power device having movable means connected to said shifting means, a pair of control devices each normally biased to an operative position tending to result in the actuation of said movable means to move said shifting means to one operative position, means for overcoming the normal bias of either of said control devices to move it to a second position releasing said movable means, and means connected to the clutch for rendering said last named means inoperative when the clutch is in engagement.

8. A gear shifting mechanism for a motor vehicle having a clutch and a transmission provided with shifting means, comprising a differential pressure power device having a pressure movable member therein connected to said shifting means, a pair of valves each normally biased to an operative position connecting a respective end of said power device to a source of differential pressure, means for overcoming the normal bias of either of said valves to move it to a second position connecting one end of said power device to the atmosphere, and means connected to the clutch for rendering said last named means inoperative when the clutch is in engagement.

9. A gear shifting mechanism for a motor vehicle having a clutch and a transmission provided with shifting means, comprising power means for moving said shifting means, a control mechanism for said power means including a plurality of movable control elements each biased in one direction, a differential pressure operated device for each control element for overcoming said biasing means to move the control elements in the other direction, and means connected to the clutch for preventing the generation of differential pressure in said devices when the clutch is in engagement.

10. A gear shifting mechanism for a motor vehicle having a clutch and a transmission provided with shifting means, comprising power means for moving said shifting means, a power source for said power means, a control mechanism for said power means including a plurality of movable control elements each biased in one direction, a differential pressure operated device for each control element for overcoming said biasing means to move the control elements in the other direction, selectively operable means for subjecting said devices to differential pressure, and means connected to the clutch and operative when the latter is in engagement for preventing operation of said last named means.

11. A gear shifting mechanism for a motor vehicle having a clutch and a transmission provided with shifting means, comprising power means for moving said shifting means, a control mechanism for said power means including a plurality of movable control elements each biased in one direction, a differential pressure operated device for each control element for overcoming said biasing means to move the control elements in the other direction, and means connected to the clutch for preventing movement of said control elements in said other direction when the clutch is in engagement.

12. A gear shifting mechanism for a motor vehicle having a clutch and a transmission provided with shifting means, comprising power means for moving said shifting means, a power source for said power means, a control mechanism for said power means including a plurality of movable control elements each biased in one direction, a differential pressure operated device for each control element for overcoming said biasing means to move the control elements in the other direction, selectively operable means for subjecting said devices to differential pressure, and means operable by the clutch when the latter is in engagement for preventing the operation of said last named means without affecting connection of said power means to said source.

13. A gear shifting mechanism for a motor vehicle having a transmission provided with shifting means, comprising differential pressure power means for moving said shifting means, a source of pressure differential for said power means, control valve mechanism for establishing differential pressure in said power means to move said shifting means selectively to a plurality of operative positions, said control valve mechanism including a plurality of control valves, fluid pressure means for operating said valves, and means operable by the clutch when the latter is in engagement for preventing the operation of said fluid pressure means without affecting connection of said power means to said source.

14. A gear shifting mechanism for a motor vehicle having a transmission provided with shifting means, comprising differential pressure power means for moving said shifting means, a source of pressure differential for said power means, control valve mechanism for establishing differential pressure in said power means to move said shifting means selectively to a plurality of operative positions, said control valve mechanism including a plurality of control valves, fluid pressure means for operating said valves, and means operable when the latter is in engagement for preventing the operation of said fluid pressure means while connection between said shifting mechanism and said source is maintained.

15. A gear shifting mechanism for a motor vehicle having a clutch and a transmission provided with shifting means, comprising a differential pressure power device having a movable member therein connected to said shifting means, a power source for said power device, a pair of valves each adapted to assume a first position connecting a respective end of said power device to a source of pressure differential and to assume a second position connecting such end of the power device to the atmosphere, both of said valves being normally biased to their first position, means for moving either of said valves to its second position, and means operative when the clutch is in engagement for preventing the operation of said last named means without affecting connection of said power device to said power source.

16. A gear shifting mechanism for a motor vehicle having a clutch and a transmission provided with shifting means, comprising a differential pressure power device having a movable member therein connected to said shifting means, a power source for said power device, a pair of valves each adapted to assume a first position connecting a respective end of said power device to a source of pressure differential and to assume a second position connecting such end of the power device to the atmosphere, both of said valves being normally biased to their first position, differential pressure operated means for selectively moving said valves to their second position, and means operative when the clutch is in engagement for preventing the functioning of said last named means without affecting connection of said power device to said source.

17. A gear shifting mechanism for a motor vehicle having a clutch and a transmission provided with shifting means, comprising a differential pressure power device having a movable member therein connected to said shifting means, a pair of valves each adapted to assume a first position connecting a respective end of said power device to a source of pressure differential and to assume a second position connecting such end of the power device to the atmosphere, both of said valves being normally biased to their first position, differential pressure operated means for moving each of said valves to its second position, each of said means including a chamber, means for connecting each chamber to a source of pressure differential, and means operated by the clutch when the latter is in engagement for preventing the operation of said last named means.

18. A gear shifting mechanism for a motor vehicle having a clutch and a transmission provided with shifting means, comprising a differential pressure power device having a movable member therein connected to said shifting means, a pair of valves each adapted to assume a first position connecting a respective end of said power device to a source of pressure differential and to assume a second position connecting such end of the power device to the atmosphere, both of said valves being normally biased to their first position, differential pressure operated means for moving each of said valves to its second position, each of said means including a chamber communicating with a source of pressure differential, and means connected to the clutch and operative when the latter is in engagement for disconnecting said chambers from the source of pressure differential and connecting them to the atmosphere.

19. A gear shifting mechanism for a motor vehicle having a clutch and a transmission provided with shifting means, comprising a differential pressure power device having a movable member therein connected to said shifting means, a pair of valves each adapted to assume a first position connecting a respective end of said power device to a source of pressure differential and to assume a second position connecting such end of the power device to the atmosphere, both of said valves being normally biased to their first position, differential pressure operated means for moving each of said valves to its second position, each of said means including a chamber, means for connecting each chamber to a source of pressure differential, and a valve connected to the clutch to communicate said chambers with the atmosphere when the clutch is in engagement.

20. A gear shifting mechanism for a motor vehicle having a clutch and a transmission provided with shifting means, comprising power means connected to said shifting means, a plurality of control devices for said power means, means biasing each control device to one position, a fluid pressure operated device for moving each control device to a second operative position against said biasing means, each fluid pressure device including a pressure chamber, a conduit affording restricted communication between each chamber and a source of differential pressure, a valve for selectively opening said chambers to the atmosphere, and means connected to the clutch and operative thereby when the latter is in engagement for closing said conduits and opening said chambers to the atmosphere.

21. A gear shifting mechanism for a motor vehicle having a transmission provided with shifting means, comprising a power device having a movable member connected to said shifting means, a pair of control elements each biased to a first position tending to result in movement of said movable member in one direction, each of said control elements being movable to a second position releasing said movable member for control by the other control element, means including a chamber and operable by partial vacuum for moving each of said control elements to its second position, means affording restricted communication between each of said chambers and a source of partial vacuum, selectively operable means for connecting said chambers to the atmosphere, and means operable by the clutch when the latter is in engagement for preventing the operation of said selectively operable means.

22. A gear shifting mechanism for a motor vehicle having a transmission provided with shifting means, comprising a power device having a movable member connected to said shifting means, a pair of control elements each biased to a first position tending to result in movement of said movable member in one direction, each of said control elements being movable to a second position releasing said movable member for control by the other control element, means including a chamber and operable by partial vacuum for moving each of said control elements to its second position, means affording restricted communication between each of said chambers and a source of partial vacuum, selectively operable means for connecting said chambers to the atmosphere, and means operated by the clutch for maintaining both of said chambers in communication with the atmosphere while the clutch is in engagement.

23. A gear shifting mechanism for a motor vehicle having a clutch and a transmission provided with shifting means, comprising a differential pressure motor having a pressure movable member connected to said shifting means, a pair of valves each normally biased to a position connecting a respective end of said motor to a source of pressure differential, valve actuating means for holding both valves in another position connecting both ends of said motor to the atmosphere and operative for releasing one valve to actuate said movable member and move said shifting means to one position, means operative when said shifting means reaches such position for releasing the other valve, and means connected to said clutch and operative thereby when the clutch is in engagement for preventing the operation of said valve actuating means.

24. A gear shifting mechanism for a motor vehicle having a clutch and a transmission provided with shifting means, comprising a differential pressure motor having a pressure movable member connected to said shifting means, a pair of valves each normally biased to a position connecting a respective end of said motor to a source of pressure differential, valve actuating means for holding both valves in another position connecting both ends of said motor to the atmosphere and operative for releasing one valve to actuate said movable member and move said shifting means to one position, a valve movable in accordance with the transmission of shift movement to said shifting means for releasing the other valve when said shifting means reaches said position, and means connected to said clutch and operative thereby when the clutch is in engagement for preventing operation of said valve actuating means.

25. A gear shifting mechanism for a motor vehicle having a transmission provided with shifting means, comprising a power device having a movable member connected to said shifting means, a pair of control elements each biased to a first position tending to result in movement of said movable member in one direction, each of said control elements being movable to a second position releasing said movable member for control by the other control element, means operable by partial vacuum for moving each of said control elements to its second position, each of said means including a vacuum chamber, a restricted conduit communicating between each of said chambers and a source of partial vacuum, selectively operable means for connecting said chambers to the atmosphere, and a valve connected to the clutch to be operated thereby, said valve maintaining said restricted conduit open when the clutch is disengaged and connecting it to the atmosphere when the clutch is in engagement.

26. A gear shifting mechanism for a motor vehicle having a transmission provided with a pair of shift rods, power means for operating said rods, freely movable means for determining the selective operation of said rods by said power means and movable between two positions, a differential pressure motor for moving said movable means between its two positions, said motor having a pair of pressure chambers, a single control valve for selectively connecting said chambers to a source of pressure differential to selectively move said movable means between its two positions, means biasing said control valve to one position connecting one of said chambers to a source of pressure differential, and means for moving said control valve to a second position connecting the other of said chambers to the source of pressure differential.

27. A gear shifting mechanism for a motor vehicle having a transmission provided with a pair of shift rods, power means for operating said rods, freely movable means for determining the selective operation of said rods by said power means and movable between two positions, a differential pressure motor for moving said movable means between its two positions, said motor having a pair of pressure chambers, a single control valve for selectively connecting said chambers to a source of pressure differential to selectively move said movable means between its two positions, means biasing said control valve to one position connecting one of said chambers to a source of pressure differential, and a differential pressure operated device manually controllable for moving said control valve to a second position connecting the other of said chambers to the source of pressure differential.

28. A gear shifting mechanism for a motor vehicle having a clutch and a transmission provided with shifting means, comprising a differential pressure power device having a member movable by differential pressure on opposite sides thereof, means for effecting a reduction in pressure at one side of said movable member, means for effecting a substantially identical reduction in pressure at the other side of said movable member, and means for retaining such balanced pressure reduction at opposite sides of said movable member when the clutch is in engagement.

29. A gear shifting mechanism for a motor vehicle having a clutch and a transmission provided with shifting means, comprising a differential pressure power device having a member movable by differential pressure on opposite sides thereof, means for effecting a reduction in pressure at one side of said movable member, means for effecting a substantially identical reduction in pressure at the other side of said movable member, and means connected to the clutch for retaining such balanced pressure reduction at opposite sides of said movable member when the clutch is in engagement.

30. A gear shifting mechanism for a motor vehicle having a clutch and a transmission provided with shifting means, comprising a differential pressure power device having a member movable by differential pressure on opposite sides thereof, means for effecting a reduction in pressure at one side of said movable member, means for effecting a substantially identical reduction in pressure at the other side of said movable member, means for establishing atmospheric pressure at said first named side of said movable member, and means connected to the clutch and operative when the latter is in engagement for rendering said last named means inoperative.

31. A gear shifting mechanism for a motor vehicle having a clutch and an H-type transmission, comprising a gear shifting assembly comprising power means for effecting movement of the transmission elements between low gear position and high gear position, a plurality of control means for said power means, pneumatic actuating means for each control means, a manual selector for said pneumatic actuating means, and means operative when the clutch is in engagement for rendering said manual selector ineffective for controlling said actuating means while maintaining said power means energized.

32. A gear shifting mechanism for a motor vehicle having a clutch and an H-type transmission, comprising a gear shifting assembly comprising power means for effecting movement of the transmission elements between low gear position and high gear position, a plurality of control means for said power means, pneumatic actuating means for each control means, a manual selector for said pneumatic actuating means, and means connected to the clutch and operative when the latter is in engagement for rendering said manual selector ineffective for controlling said actuating means.

33. A gear shifting mechanism for a motor vehicle having a clutch and an H-type transmission, comprising a gear shifting assembly comprising power means for effecting movement of the transmission elements between low gear position and high gear position, a plurality of control means for said power means, pneumatic actuating means for each control means, a manual selector for said pneumatic actuating means, and means connected to the clutch and operative when the latter is in engagement for preventing the operation of said pneumatic actuating means.

EDWARD G. HILL.
HENRY W. HEY.